(12) United States Patent
Swift

(10) Patent No.: US 6,951,359 B2  
(45) Date of Patent: Oct. 4, 2005

(54) SEAT FOR MOTOR VEHICLE

(76) Inventor: Michel Swift, 30 Bates, app.603, Outremont (CA), H2V 4T4

(*) Notice: Subject to any disclaimer, the term of this patent is extended or adjusted under 35 U.S.C. 154(b) by 0 days.

(21) Appl. No.: 10/782,893

(22) Filed: Feb. 23, 2004

(65) Prior Publication Data

US 2004/0164582 A1 Aug. 26, 2004

Related U.S. Application Data

(60) Provisional application No. 60/448,539, filed on Feb. 21, 2003.

(51) Int. Cl.$^7$ .............................. B60N 2/005; B60N 2/24
(52) U.S. Cl. ..................... 296/64; 296/24.34; 296/24.4; 296/24.43; 296/24.46; 296/63; 296/66
(58) Field of Search ............................. 296/24.3, 24.34, 296/24.4, 24.43, 24.46, 63, 64, 66, 69, 191

(56) References Cited

U.S. PATENT DOCUMENTS

| | | | | | |
|---|---|---|---|---|---|
| 3,214,211 A | * | 10/1965 | Setina | ...................... | 296/24.46 |
| 4,113,270 A | * | 9/1978 | Barecki | ....................... | 296/63 |
| 4,173,369 A | * | 11/1979 | Roggin | .................... | 296/24.46 |
| 4,231,144 A | | 11/1980 | Bernacchia, Jr. | | |
| 4,473,250 A | * | 9/1984 | Truex et al. | ................... | 296/69 |
| 4,505,509 A | * | 3/1985 | Simeri et al. | ................. | 296/63 |
| 4,595,227 A | * | 6/1986 | Setina | ...................... | 296/24.46 |
| 4,847,972 A | | 7/1989 | Anderson et al. | | |
| 4,932,709 A | * | 6/1990 | Wainwright | ................ | 296/69 |
| 5,288,124 A | | 2/1994 | Ward | | |
| 5,301,997 A | | 4/1994 | Cudden | | |
| 5,305,512 A | | 4/1994 | Ward | | |
| 5,511,842 A | * | 4/1996 | Dillon | ......................... | 296/63 |
| 5,797,649 A | * | 8/1998 | Snell et al. | ................... | 296/63 |
| 6,142,572 A | * | 11/2000 | Allen | .......................... | 296/63 |
| 6,390,537 B1 | | 5/2002 | DiGonis | | |
| 6,851,736 B1 | * | 2/2005 | Klopp et al. | ............ | 296/24.34 |
| 2004/0160080 A1 | * | 8/2004 | Shibata et al. | ................ | 296/64 |

* cited by examiner

Primary Examiner—Jason Morrow
(74) Attorney, Agent, or Firm—Franz Bonsang; Equinox Int'l (57) ABSTRACT

An interior rear seat for a motor vehicle includes a main seat located in a vehicle rear cabin portion that has opposed two end side portions, and a first rear interior side panel connected to a first inner vehicle skin surface and located adjacent an inwardly projecting wheel arch of the vehicle. The first side panel has a first seating portion that is continuous with one of the end side portions to extend the main seat adjacent the wheel arch. The rear seat with increased comfort is typically part of a production vehicle converted into a taxi vehicle. The invention also concerns a method for modifying a production vehicle with the rear seat.

43 Claims, 5 Drawing Sheets

SEAT FOR MOTOR VEHICLE

CROSS-REFERENCE TO RELATED APPLICATION

Priority of U.S. Provisional Application for Patent No. 60/448,539, filed on Feb. 21, 2003, is hereby claimed.

FIELD OF THE INVENTION

The present invention relates to the field of motor vehicles, and more particularly a seat for motor vehicle, especially for use with production vehicles transformed or converted into public transportation vehicles adapted for comfortably and conveniently transporting or taxiing small groups of people, and method of transforming the production vehicle.

BACKGROUND OF THE INVENTION

The industry of taxi vehicles has always been present in most modern cities. Such taxi vehicles have different designs, sizes depending on the region they provide service for and/or local regulations. Despite the fact that many companies proposed different vehicle designs, such vehicles were generally expensive (due to the relatively low demand compared to private vehicles found on the market) and not always well suited for the transportation of small groups of people, with their belongings when applicable.

In most cities, although taxi vehicles need to meet some standards and are subject to basic regulations, they are often owned by individuals, usually the respective taxi driver. Accordingly, the proposed levels relating to the size (room) of the vehicle, the comfort, the practicality, the safety, the ability to carry handicapped people (with personal transport aids) and the like found at a specific location may significantly vary from vehicle to vehicle, thus rendering the taxi service not too attractive to people, in general.

Accordingly, there is a need for an improved motor vehicle that could become a standard vehicle well suited for taxiing people with a minimum expected service quality and an improved seat with minimum expected seating comfort level, also adapted to the future needs.

SUMMARY OF THE INVENTION

It is therefore a general object of the present invention to provide an improved rear seat for motor vehicle.

It is also an object of the present invention to provide an improved motor vehicle and the method of manufacture such vehicle.

An advantage of the present invention is that the rear seat for motor vehicle provides for comfortable seating that can accommodate stronger people with preferably high durability of the materials used therefore.

Another advantage of the present invention is that the motor vehicle, when used as a taxi vehicle, is affordable while improving the overall conventional taxi service.

A further advantage of the present invention is that the motor vehicle is easily adaptable to different configurations depending on the specific needs and/or regulations.

Still another advantage of the present invention is that the motor vehicle is a relatively small transformation of an existing vehicle such as the conventionally called minivan-type vehicle and/or SUV (Sport Utility Vehicle) or the like.

Still a further advantage of the present invention is that the method for manufacturing the motor vehicle includes modifying/transforming/converting mostly the inside of an existing vehicle.

Yet another advantage of the present invention is that the motor vehicle, especially when used for taxiing people, provides for sufficient room for easy and wide access to any seat, comfortable seating that can accommodate stronger people, high durability of the materials used in the different components, safety environment, additional luggage compartments, safety box deposit, electronic payment facility, electronic information center for clients and/or up-to-date electronic console for the driver.

Another advantage of the present invention is that the motor vehicle can be used for advertisement if required.

According to a first aspect of the present invention, there is provided an interior rear seat for a motor vehicle, the seat comprises:

a main seat located in a vehicle rear cabin portion, the main seat having generally opposed first and second end side portions thereof;
  a first rear interior side panel connected to a first inner vehicle skin surface and located adjacent a first inwardly projecting wheel arch of the vehicle, the first side panel having a first seating portion thereof, the first seating portion being continuous with the first end side portion so as to extend the main seat adjacent the first wheel arch.

Typically, the seat further includes:

a second rear interior side panel connected to a second inner vehicle skin surface and located adjacent a second inwardly projecting wheel arch of the vehicle, the second side panel having a second seating portion thereof, the second seating portion being continuous with the second end side portion so as to extend the main seat adjacent the second wheel arch.

Typically, the first side panel includes:

generally opposed first and second sections;
  an intermediate section extending between the first and second sections, the intermediate section forming the first seating portion.

Typically, the intermediate section is a ledge forming the first seating portion. The main seat defines a seating surface thereof, the ledge defining a ledge surface thereof, the ledge surface being substantially aligned with the seating surface so as to be continuous therewith.

Typically, the main seat defines a backrest surface thereof and has a front end portion thereof, the ledge extending frontwardly from a location adjacent the backrest surface at the first end side portion to a location adjacent the front end portion at the first end side portion; preferably the ledge extends frontwardly beyond the front end portion of the main seat.

According to another aspect of the present invention, there is provided a motor vehicle for taxiing passengers, the vehicle comprising an interior rear seat located inside a rear cabin portion thereof, the rear seat includes:

a main seat located in the vehicle rear cabin portion, the main seat having generally opposed first and second end side portions thereof;
  a first rear interior side panel connected to a first inner vehicle skin surface and located adjacent a first inwardly projecting wheel arch of the vehicle, the first side panel having a first seating portion thereof, the first seating portion being continuous with the first end side portion so as to extend the main seat adjacent the first wheel arch.

Typically, the rear seat further includes:

a second rear interior side panel connected to a second inner vehicle skin surface and located adjacent a second inwardly projecting wheel arch of the vehicle, the second side panel having a second seating portion thereof, the second seating portion being continuous with the second end side portion so as to extend the main seat adjacent the second wheel arch.

In one embodiment, the vehicle further includes:

a front section, a rear section and an intermediate section extending therebetween, the vehicle having a floor spanning over the front, intermediate and rear sections and laterally extending between opposed first and second lateral side walls thereof, the rear section including the interior rear seat;

a two-level floor having an upper floor level defining the front and rear sections and a lower floor level defining the intermediate section, the two-level floor laterally extending between the first and second lateral side walls.

Typically, the rear cabin portion includes the intermediate and rear sections of the vehicle, the front section defining a front cabin portion of the vehicle, the vehicle further including:

a partition wall extending between and connecting to the first and second lateral side walls, the partition wall separating the front and rear cabin portions from one another.

Typically, the partition wall substantially covers a lower half portion of an opening between the front and rear cabin portions, the vehicle further including:

a generally transparent protective sheet connected to the partition wall and the first and second lateral side walls, the protective sheet substantially covering an upper half portion of the opening between the front and rear cabin portions.

In one embodiment, the vehicle further includes:

at least one jump seat located into the rear cabin portion, the jump seat having a retractable seating portion and a backrest portion thereof, the seating portion connecting to the lower floor level of the floor and being retractable between a retracted unused position and an extended use position, the backrest portion connecting to the partition wall.

Typically, the at least one jump seat is rearwardly oriented within the rear cabin portion generally facing the main seat.

Typically, the vehicle further includes:

at least one grab handle connecting to one of the first and second lateral side walls and inwardly extending therefrom so as to allow easy grabbing thereof by a passenger, the grab handle being located adjacent the rear seat.

Typically, the front cabin portion includes a driver seat adjacent one of the first and second lateral side walls, the vehicle further including:

a luggage compartment located between the driver seat and the other one of the first and second lateral side walls.

Alternatively, the front cabin portion includes a driver seat adjacent one of the first and second lateral side walls, the vehicle being a taxi vehicle and further including:

a driver console located adjacent the driver seat opposite the one of the first and second lateral side walls, the driver console including a taxi meter.

Typically, the vehicle further includes:

a display center electrically connected to the driver console for displaying information received therefrom, the display center being located within the rear cabin portion;

a payment station electrically connected to the driver console, the payment station being located within the rear cabin portion;

a luggage compartment located between the driver console and the other one of the first and second lateral side walls;

a computer unit mounted therein, the computer unit connecting to the payment station and the display center for control thereof.

Typically, the vehicle is a minivan-type vehicle.

In another aspect of the present invention, there is provided a method for modifying a production vehicle into a motor vehicle for taxiing passengers, the vehicle having a main seat located in a vehicle rear cabin portion thereof and first and second rear interior covers connected to respective first and second inner vehicle skin surfaces, the first and second interior covers being located adjacent respective first and second inwardly projecting wheel arches of the vehicle, the main seat having generally opposed first and second end side portions thereof, the first end side portion being located adjacent the first wheel arch, the method comprises:

connecting a first rear interior side panel to the first inner vehicle skin surface in replacement of the first interior cover, the first side panel having a first seating portion thereof, the first seating portion being continuous with the first end side portion so as to extend the main seat adjacent the first wheel arch.

Typically, the vehicle further has a front section, a rear section and an intermediate section extending therebetween, the vehicle having a floor spanning over the front, intermediate and rear sections and laterally extending between opposed first and second lateral side walls thereof, the rear section including the interior rear seat, the method comprising:

lowering an intermediate portion of the floor of the vehicle intermediate section into a lower floor level, the floor portion of the vehicle front and rear sections defining an upper floor level;

connecting a second rear interior side panel to the second inner vehicle skin surface in replacement of the second interior cover, the second side panel having a second seating portion thereof, the second seating portion being continuous with the second end side portion so as to extend the main seat adjacent the second wheel arch.

Typically, the front cabin portion includes a driver seat adjacent one of the first and second lateral side walls, the vehicle being a taxi vehicle, the method further comprises:

installing a driver console located adjacent the driver seat opposite the one of the first and second lateral side walls, the driver console including a taxi meter;

installing a display center within the rear cabin portion, the display center being electrically connected to the driver console for displaying information received therefrom;

installing a payment station within the rear cabin portion, the payment station being electrically connected to the driver console;

installing a luggage compartment between the driver console and the other one of the first and second lateral side walls in replacement of the passenger seat;

installing the display center at an upper region of the rear cabin portion adjacent the front cabin portion and a roof of the vehicle;

installing the payment station adjacent the partition wall.

Typically, the method further comprises:

installing a predetermined seat within the rear cabin portion in replacement of the main seat, the predetermined seat being more comfortable and more long-lasting than the main seat.

Typically, the production vehicle is a minivan-type vehicle.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

With reference to the annexed drawings the preferred embodiments of the present invention will be herein described for indicative purpose and by no means as of limitation.

Referring to FIGS. 1 to 4, there is shown a motor vehicle 20 in accordance with an embodiment of the present invention. The motor vehicle, typically a taxi 20, is basically an existing vehicle 22, typically of a commonly called minivan-type production vehicle or the like, sold for private use that is internally transformed so as to be adapted for taxiing small groups of people. Although not shown and described herein, someone skilled in the art would recognize the motor vehicle includes any type of motor vehicle having a rear passenger seat located adjacent an inwardly projecting wheel arch 23 without departing from the scope of the present invention.

Typically, the motor vehicle 22 includes an interior rear seat 70 that includes a main seat 36 located in a vehicle rear cabin portion or passenger compartment 28. The main seat 36 has generally opposed first and second end side portions 72, 74 thereof. The rear seat 70 further includes a first rear interior side panel 32 connected to a first inner vehicle skin surface and located adjacent a first inwardly projecting wheel arch 23 of the vehicle 22. The first side panel 32 has a first seating portion 76 that is continuous with the first end side portion 72 to laterally extend the main seat 36 adjacent the first wheel arch 23, and increase the general comfort level of the passengers, especially the stronger passengers.

Typically, the predetermined back bench or rear seat 36 is adapted and made out of more robust materials than the conventional one installed in production it replaces since it is more suited for an extensive use an experienced in taxi-related environment.

Typically, the seat 70 includes a second rear interior side panel 32' connected to a second inner vehicle skin surface and located adjacent a second inwardly projecting wheel arch 23 of the vehicle 22. The second side panel 32' has a second seating portion 76 that is continuous with the second end side portion 74 to laterally extend the main seat 36 adjacent the second wheel arch 23.

Each first 32 and second 32' side panel includes generally opposed first upper 78 and second lower 80 sections, and an intermediate section 82 that extends there between. The intermediate section 82 such as a ledge or the like forms the first seating portion 76.

Accordingly, the ledge 82 defines a ledge surface 84 that is substantially aligned with a seating surface 86 of the main seat 36 to be continuous therewith.

Typically, the ledge 82 extends frontwardly from a location adjacent a backrest surface 88 of the main seat 36 to a location adjacent a front end portion 90 of the main seat 36, and preferably beyond the front end portion 90 of the main seat 36, up to the respective sliding door.

Figure 1:
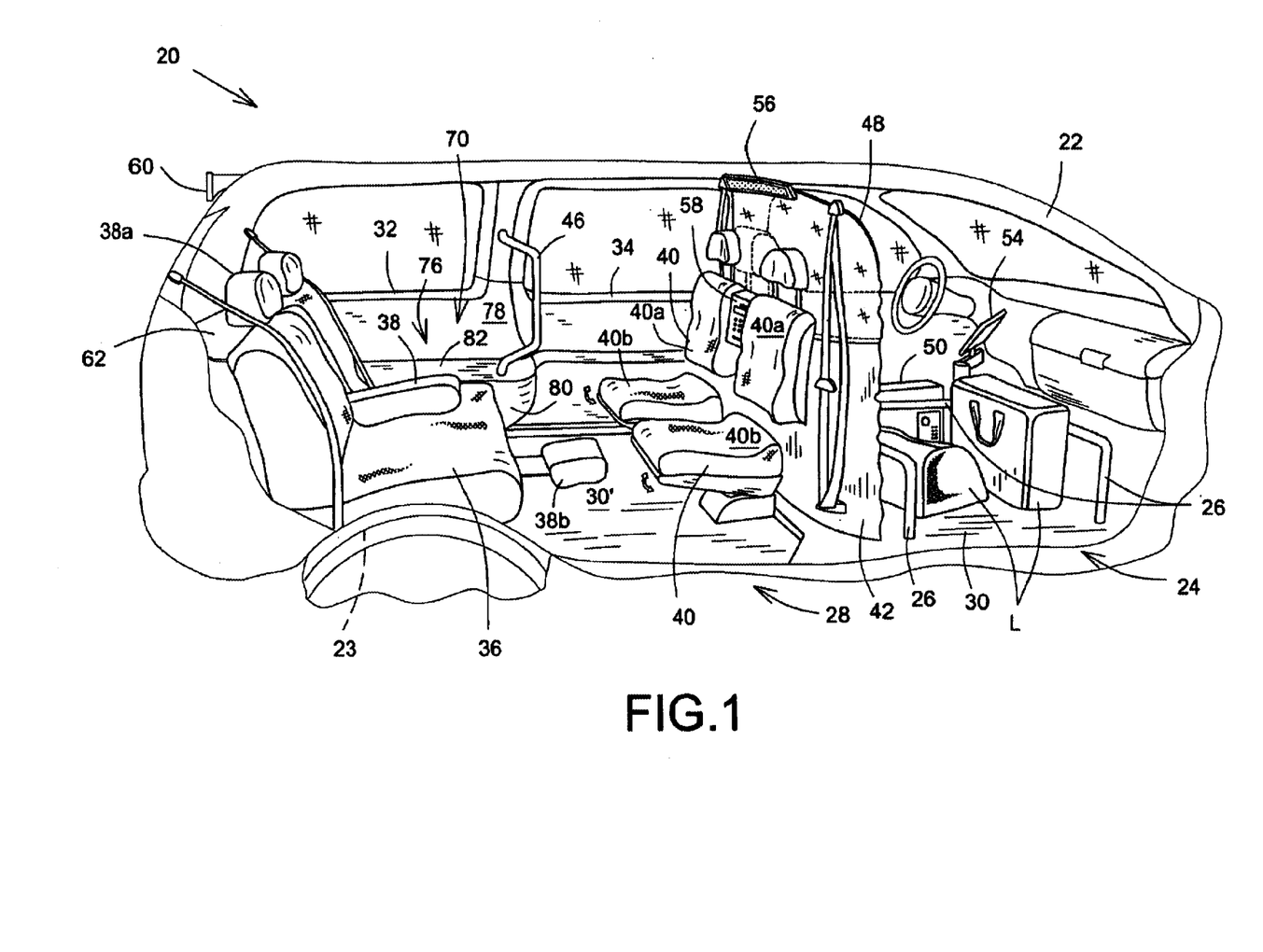
FIG. 1 is a simplified cutaway side perspective view of an embodiment of a motor vehicle in accordance with the present invention.
Figure 4:
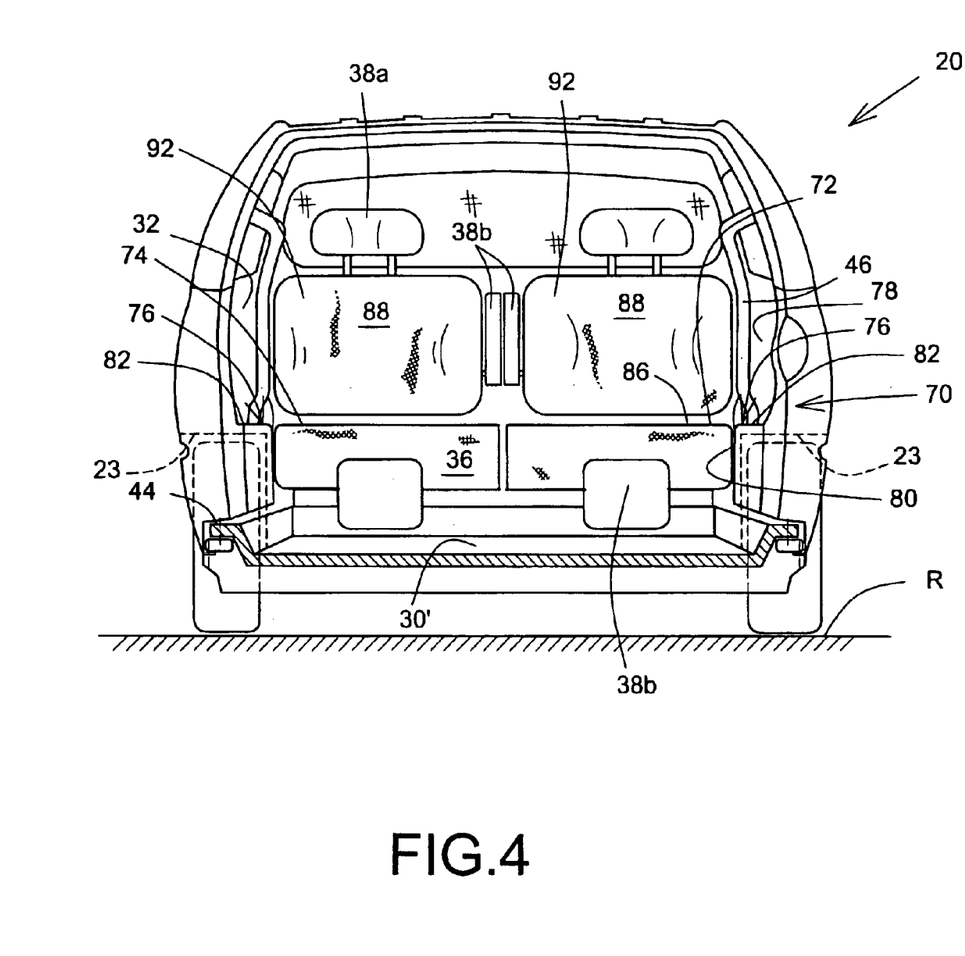
FIG. 4 is a simplified enlarged side perspective view of another embodiment of a rear seat in accordance with the present invention, showing rear seat with robust rear interior side panels and easy-grab handles from the partition wall.

Typically, the main seat 36 includes an armrest 38 that is substantially centered between the first and second end side portions 72, 74. The armrest 38 is pivotally connected to a backrest portion 92 of the main seat 36 for pivoting movement between a closed position as shown in FIG. 4 and an open position as shown in FIG. 1.

Typically, the passenger, or helper, front seat of the existing vehicle 22 is removed to transform the volume into a luggage compartment 24 with retaining bars 26 and optionally straps (not shown) to prevent luggage L from falling and moving around during displacement of the taxi 20. The passenger compartment 28 generally undergoes the following main transformations. The original upper level floor 30 is removed in the intermediate section of the vehicle 22 and replaced by a recessed or lower level floor 30' in order to increase the internal height of the compartment 28 such that passenger's mobility is increased while entering and exiting the vehicle 20. The original side panels are removed and replaced by new panels 32, 34 on fixed walls and on the sliding doors, respectively. The new panels 32, 34 are exempt of small compartments (not shown) again to increase the overall internal dimensions of the compartment 28, and prevent temporary passengers from leaving personal belongings therein. The side panels 32, 34 are made out of materials that are more robust and long lasting that original panels.

Due to the lowering of the floor level of the recessed floor 30', for safety and regulation purposes, the fuel (or gas) tank and the muffler (not shown) of the existing vehicle 22 need to be relocated so as to ensure a minimum clearance between the vehicle 20 and the ground or road R.

Figure 2:
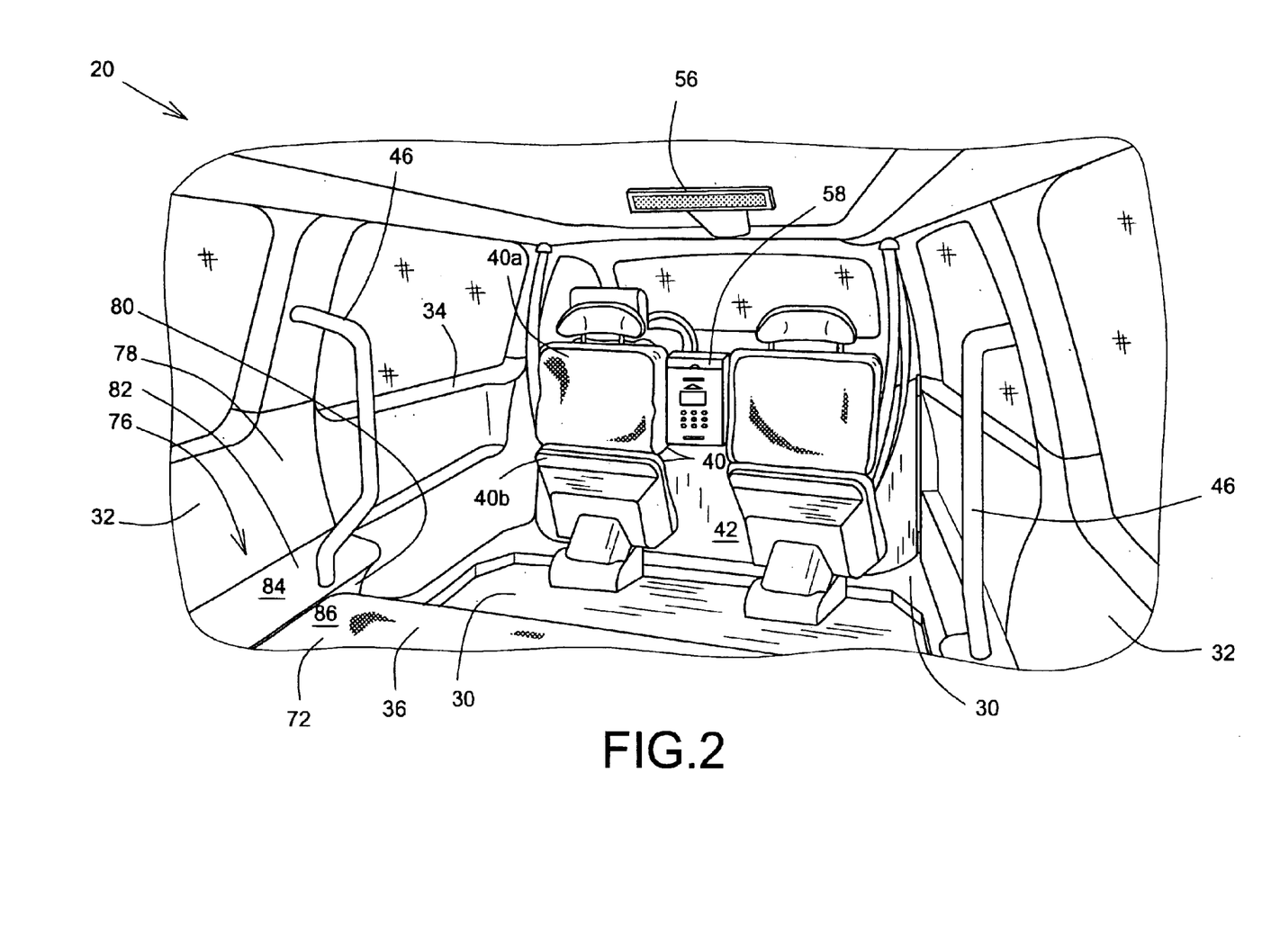
FIG. 2 is a simplified enlarged side perspective view of the embodiment of FIG. 1, showing the front portion of the passenger compartment from the rear seat.

Two reversed jump seats 40 are typically mounted on a partition wall 42, preferably made out of composite material or the like. The jump seats 40 fold into a folded configuration when not used and also to increase the access opening so as to facilitate the access to the compartment 28, as shown in FIG. 2. The jump seats 40 typically have their backrests 40a fixed to the partition wall 42 and their seating portions 40b hingeably connected to the floor adjacent a lower back edge of the respective backrest 40a so as to increase the overall rigidity when in the unfolded configuration and the compactness when in the folded configuration.

Also, the door sill 44 is slightly lowered, from the original version, for safety and access purposes. Safety grab handles 46 are also provided to ease the accessibility of the compartment 28 as well as the movement of the passengers within the compartment 28.

Optionally, a transparent safety shield 48, removably mounted above the partition wall 42, separates the passenger compartment 28 from the driver compartment. The safety shield 48 could have a slidable door (not shown) built-in if required.

For ergonomic reasons, the typical internal dimensions of the passenger compartment 28 should be approximately fifty-four (54) inch wide and between approximately fifty (50) and fifty-eight (58) inch high, preferably about fifty-four (54) inches. Also, the door sill 44 is kept at about fifteen (15) inches above the ground or road R to allow easy access to the compartment 28 by most of the passengers.

Figure 3:
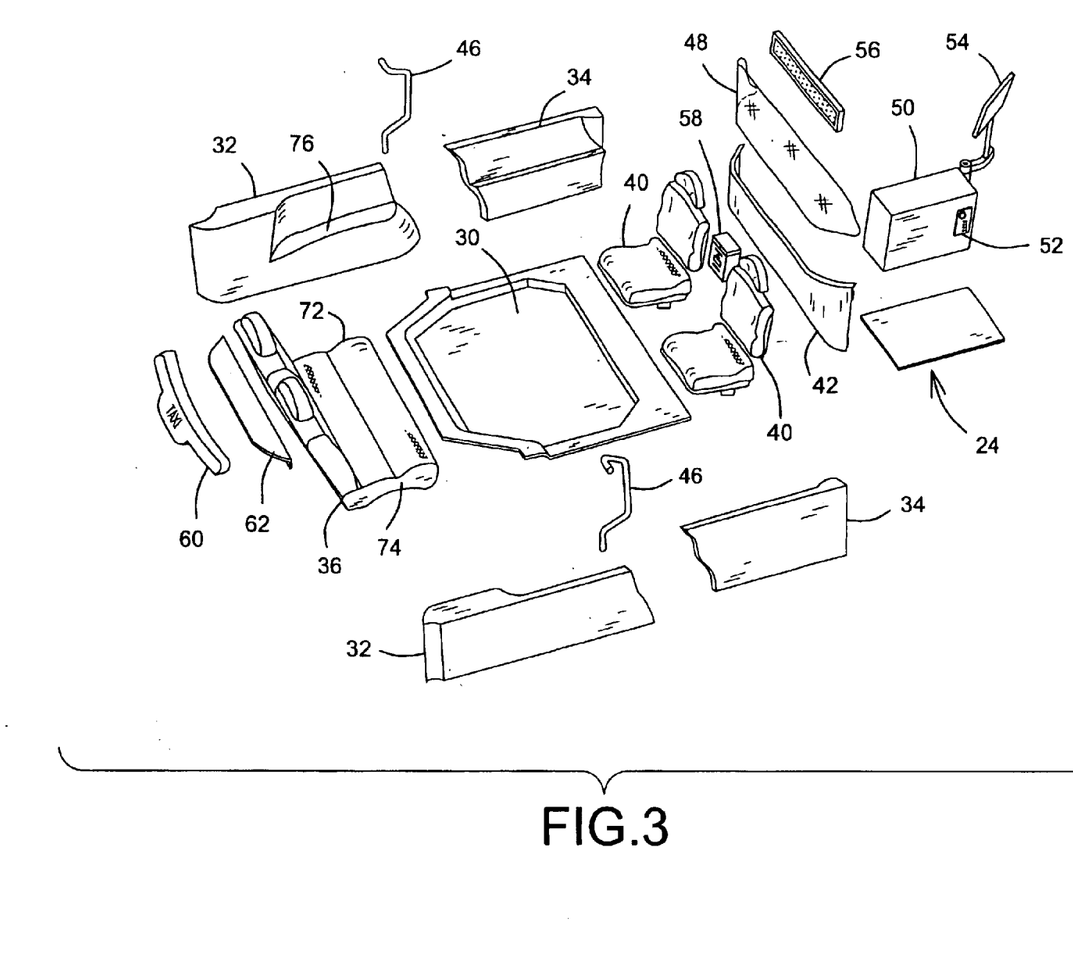
FIG. 3 is a simplified schematic exploded perspective view, showing the typical components installed in a conventional existing mini-van for modification into a taxi vehicle in accordance with an embodiment of the present invention.

Referring to FIGS. 1 and 3, the specially adapted luggage compartment 24 located beside the driver on the passenger side helps retaining the passenger's luggage L during displacement of the vehicle 20. Adjacent the luggage compartment 24, the driver console 50 typically includes a safe box deposit 52 for receiving important ID papers or the like, the belongings of the driver, the intercom system, the taximeter, etc. The driver console 50 is typically an up-to-date electronic console 50 that includes a display 54 or the like as known in the art for use with GPS (Global Positioning System) navigation system and the like.

Referring to FIGS. 1 to 3, there is shown an electronic communication and/or information display center 56 located generally at the ceiling of the passenger compartment 28. The information center 56 typically provides information to the passengers such as weather conditions, outside temperature, time, traveled distance and corresponding taxi service fee, as well as advertising, etc., in different selectable languages. The information center 56 could also allow for electronic and/or voice communication with the driver console 50 and with the driver.

Referring to FIGS. 1 to 4, there is shown a view of the bench seat 36, with its armrest 38, at the back of the vehicle 20. As illustrated, the side panels 32 are shaped with a seating portion 76 that is a lateral extension to the seat 36 to provide for more room whenever required, such as when three normal size passengers or two strong passengers seat of the bench 36.

As shown in FIGS. 1 to 3, in between the two jump seats 40 in folded configuration and unfolded configuration respectively, there is typically an electronic payment station 58 that can be used by the passengers to directly do the payment of the taxi service using a conventional credit card, direct payment card (or debit card) or the like. Typically, the driver console 50 includes a computer unit (not shown) or the like electrically connected to the payment station 58 and to the display center 56 that controls the operation thereof.

In upper class versions of the motor vehicle 22, the back seat 36 typically includes two independent reclinable seats 36', reclinable between an upright position and a reclined position, with adjustable armrests 38', headrests 38a and legrests 38b. The legrests 38b are generally retractable between a retracted position as shown in FIG. 1 when the main seat 36' is in the upright position and an extended position as shown in FIG. 4 when the main seat is in the reclined position.

Figure 5:
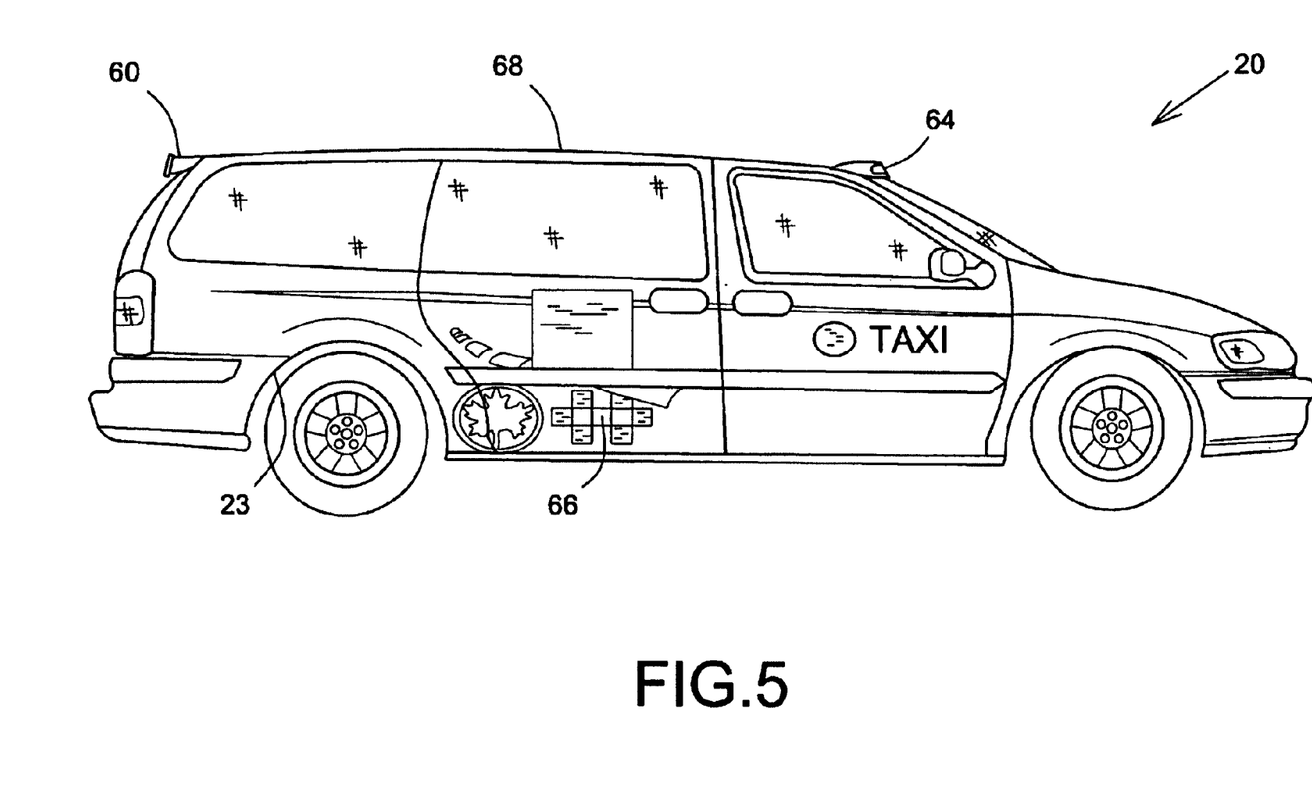
FIG. 5 is a side view of the embodiment of FIG. 1, showing a typical advertisement on the side wall of the motor vehicle.

FIG. 5 illustrates typical components in an exploded view, for assembly inside the existing vehicle 22 to transform it into the motor vehicle 20 of the present invention. To highlight the fact that the vehicle 20 is a taxi service, a rear domelight 60 is generally installed at the back of the vehicle 20. The domelight 60 can also be used for emergency signals whenever required. A conventional lockable retractable trunk shield 62 can also be installed upon the specific needs.

A frontal domelight 64 is also installed as on conventional taxi vehicles, as shown in FIG. 5. FIG. 5 shows that the taxi or motor vehicle 20 can be used for advertising, with ads 66, 68 on the side and the roof of the vehicle 20, respectively, as already seen on other types of public transportation vehicles.

The present invention further refer to a corresponding method for modifying/converting/transforming a production vehicle 22 into a motor vehicle 20 for taxiing passengers therewith.

Although the present seat for motor vehicle and the corresponding vehicle have been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. An interior rear seat for a motor vehicle, the seat comprising:
   a main seat located in a vehicle rear cabin portion, the main seat having generally opposed first and second end side portions thereof;
   a first rear interior side panel connected to a first inner vehicle skin surface and located adjacent a first inwardly projecting wheel arch of the vehicle, the first side panel having a first seating portion thereof, the first seating portion being continuous with the first end side portion so as to extend the main seat adjacent the first wheel arch.

2. The seat of claim 1, further including:
   a second rear interior side panel connected to a second inner vehicle skin surface and located adjacent a second inwardly projecting wheel arch of the vehicle, the second side panel having a second seating portion thereof, the second seating portion being continuous with the second end side portion so as to extend the main seat adjacent the second wheel arch.

3. The seat of claim 1, wherein the first side panel includes:
   generally opposed first and second sections;
   an intermediate section extending between the first and second sections, the intermediate section forming the first seating portion.

4. The seat of claim 3, wherein the intermediate section is a ledge forming the first seating portion.

5. The seat of claim 4, wherein the main seat defines a seating surface thereof, the ledge defining a ledge surface thereof, the ledge surface being substantially aligned with the seating surface so as to be continuous therewith.

6. The seat of claim 5, wherein the main seat defines a backrest surface thereof and has a front end portion thereof, the ledge extending frontwardly from a location adjacent the backrest surface at the first end side portion to a location adjacent the front end portion at the first end side portion.

7. The seat of claim 6, wherein the ledge extends frontwardly beyond the front end portion of the main seat.

8. The seat of claim 2, wherein the main seat includes an armrest, the armrest being substantially centered between the first and second end side portions.

9. The seat of claim 8, wherein the armrest is pivotally connected to a backrest portion of the main seat, the armrest being pivotable between a closed position and an open position.

10. The seat of claim 1, wherein the main seat is reclinable between an upright position and a reclined position.

11. The seat of claim 10, wherein the main seat is includes a legrest, the legrest being retractable between a retracted position when the main seat is in the upright position and an extended position when the main seat is in the reclined position.

12. A motor vehicle for taxiing passengers, the vehicle comprising an interior rear seat located inside a rear cabin portion thereof, the rear seat including:
   a main seat located in the vehicle rear cabin portion, the main seat having generally opposed first and second end side portions thereof;
   a first rear interior side panel connected to a first inner vehicle skin surface and located adjacent a first inwardly projecting wheel arch of the vehicle, the first side panel having a first seating portion thereof, the first seating portion being continuous with the first end side portion so as to extend the main seat adjacent the first wheel arch.

13. The vehicle of claim 12, wherein the rear seat further includes:
   a second rear interior side panel connected to a second inner vehicle skin surface and located adjacent a second inwardly projecting wheel arch of the vehicle, the second side panel having a second seating portion thereof, the second seating portion being continuous with the second end side portion so as to extend the main seat adjacent the second wheel arch.

14. The vehicle of claim 13, further including:
   a front section, a rear section and an intermediate section extending therebetween, the vehicle having a floor spanning over the front, intermediate and rear sections and laterally extending between opposed first and second lateral side walls thereof, the rear section including the interior rear seat,
   a two-level floor having an upper floor level defining the front and rear sections and a lower floor level defining the intermediate section, the two-level floor laterally extending between the first and second lateral side walls.

15. The vehicle of claim 14, wherein the rear cabin portion includes the intermediate and rear sections of the vehicle, the front section defining a front cabin portion of the vehicle, the vehicle further including:
   a partition wall extending between and connecting to the first and second lateral side walls, the partition wall separating the front and rear cabin portions from one another.

16. The vehicle of claim 15, wherein the partition wall substantially covers a lower half portion of an opening between the front and rear cabin portions, the vehicle further including:
   a generally transparent protective sheet connected to the partition wall and the first and second lateral side walls, the protective sheet substantially covering an upper half portion of the opening between the front and rear cabin portions.

17. The vehicle of claim 15, further including:
   at least one jump seat located into the rear cabin portion, the jump seat having a retractable seating portion and a backrest portion thereof, the seating portion connecting to the lower floor level of the floor and being retractable between a retracted unused position and an extended use position, the backrest portion connecting to the partition wall.

18. The vehicle of claim 17, wherein the at least one jump seat is rearwardly oriented within the rear cabin portion generally facing the main seat.

19. The vehicle of claim 17, further including:
   at least one grab handle connecting to one of the first and second lateral side walls and inwardly extending therefrom so as to allow easy grabbing thereof by a passenger, the grab handle being located adjacent the rear seat.

20. The vehicle of claim 19, wherein the front cabin portion includes a driver seat adjacent one of the first and second lateral side walls, the vehicle further including:
   a luggage compartment located between the driver seat and the other one of the first and second lateral side walls.

21. The vehicle of claim 19, wherein the front cabin portion includes a driver seat adjacent one of the first and second lateral side walls, the vehicle being a taxi vehicle and further including:
   a driver console located adjacent the driver seat opposite the one of the first and second lateral side walls, the driver console including a taxi meter.

22. The vehicle of claim 21, further including:
   a display center electrically connected to the driver console for displaying information received therefrom, the display center being located within the rear cabin portion.

23. The vehicle of claim 22, further including:
   a payment station electrically connected to the driver console, the payment station being located within the rear cabin portion.

24. The vehicle of claim 23, further including:
   a luggage compartment located between the driver console and the other one of the first and second lateral side walls.

25. The vehicle of claim 24, wherein the driver console includes:
   a computer unit mounted therein, the computer unit connecting to the payment station and the display center for control thereof.

26. The vehicle of claim 12, wherein the vehicle is a minivan-type vehicle.

27. The vehicle of claim 21, wherein the vehicle is a minivan-type vehicle.

28. A method for modifying a production vehicle into a motor vehicle for taxiing passengers, the vehicle having a main seat located in a vehicle rear cabin portion thereof and first and second rear interior covers connected to respective first and second inner vehicle skin surfaces, the first and second interior covers being located adjacent respective first and second inwardly projecting wheel arches of the vehicle, the main seat having generally opposed first and second end side portions thereof, the first end side portion being located adjacent the first wheel arch, the method comprising:
   connecting a first rear interior side panel to the first inner vehicle skin surface in replacement of the first interior cover, the first side panel having a first seating portion thereof, the first seating portion being continuous with the first end side portion so as to extend the main seat adjacent the first wheel arch.

29. The method of claim 28, further comprising:
   connecting a second rear interior side panel to the second inner vehicle skin surface in replacement of the second interior cover, the second side panel having a second seating portion thereof, the second seating portion being continuous with the second end side portion so as to extend the main seat adjacent the second wheel arch.

30. The method of claim 29, wherein the vehicle further has a front section, a rear section and an intermediate section extending therebetween, the vehicle having a floor spanning over the front, intermediate and rear sections and laterally extending between opposed first and second lateral side walls thereof, the rear section including the interior rear seat, the method comprising:

lowering an intermediate portion of the floor of the vehicle intermediate section into a lower floor level, the floor portion of the vehicle front and rear sections defining an upper floor level.

connecting a second rear interior side panel to the second inner vehicle skin surface in replacement of the second interior cover, the second side panel having a second seating portion thereof, the second seating portion being continuous with the second end side portion so as to extend the main seat adjacent the second wheel arch.

31. The method of claim 30, wherein the rear cabin portion includes the intermediate and rear sections of the vehicle, the front section defining a front cabin portion of the vehicle, the method comprising:

installing a partition wall to separate the front and rear cabin portions from one another, the partition wall extending between and connecting to the first and second lateral side walls.

32. The method of claim 31, further comprising:

installing at least one jump seat into the rear cabin portion, the jump seat having a retractable seating portion and a backrest portion thereof, the seating portion connecting to the lower floor level of the floor and being retractable between a retracted unused position and an extended use position, the backrest portion connecting to the partition wall.

33. The method of claim 32, further comprising:

installing at least one grab handle adjacent the rear seat, the grab handle connecting to one of the first and second lateral side walls and inwardly extending therefrom so as to allow easy grabbing thereof by a passenger.

34. The method of claim 33, wherein the front cabin portion includes a driver seat and a passenger seat adjacent the first and second lateral side walls respectively, the method further comprising:

installing a luggage compartment between the driver seat and the second lateral side wall in replacement of the passenger seat.

35. The method of claim 33, wherein the front cabin portion includes a driver seat adjacent one of the first and second lateral side walls, the vehicle being a taxi vehicle, the method further comprising:

installing a driver console located adjacent the driver seat opposite the one of the first and second lateral side walls, the driver console including a taxi meter.

36. The method of claim 35, further comprising:

installing a display center within the rear cabin portion, the display center being electrically connected to the driver console for displaying information received therefrom.

37. The method of claim 36, further comprising:

installing a payment station within the rear cabin portion, the payment station being electrically connected to the driver console.

38. The method of claim 37, wherein the front cabin portion includes a passenger seat adjacent the other one of the first and second lateral side walls, the method further comprising:

installing a luggage compartment between the driver console and the other one of the first and second lateral side walls in replacement of the passenger seat.

39. The method of claim 38, wherein the driver console includes a computer unit mounted therein, the computer unit connecting to the payment station and the display center for control thereof, the method comprising:

installing the display center at an upper region of the rear cabin portion adjacent the front cabin portion and a roof of the vehicle;

installing the payment station adjacent the partition wall.

40. The method of claim 29, further comprising:

installing a predetermined seat within the rear cabin portion in replacement of the main seat, the predetermined seat being more comfortable and more long-lasting than the main seat.

41. The method of claim 40, further comprising:

relocating the main seat further rearward within the rear cabin portion so as to increase the space in front thereof.

42. The method of claim 28, wherein the production vehicle is a minivan-type vehicle.

43. The method of claim 35, wherein the production vehicle is a minivan-type vehicle.

* * * * *